(12) United States Patent
Lawrenson et al.

(10) Patent No.: US 10,705,615 B2
(45) Date of Patent: Jul. 7, 2020

(54) MOBILE COMMUNICATIONS DEVICE WITH ADAPTIVE FRICTION OF THE HOUSING

(71) Applicant: TELEFONAKTIEBOLAGET LM ERICSSON (PUBL), Stockholm (SE)

(72) Inventors: Matthew John Lawrenson, Bussigny (CH); Julian Charles Nolan, Pully (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/165,078

(22) Filed: Oct. 19, 2018

(65) Prior Publication Data

US 2019/0050058 A1    Feb. 14, 2019

Related U.S. Application Data

(63) Continuation of application No. 15/513,747, filed as application No. PCT/SE2014/051103 on Sep. 25, 2014, now Pat. No. 10,139,910.

(51) Int. Cl.
*G08B 21/00*    (2006.01)
*G06F 3/01*     (2006.01)
(Continued)

(52) U.S. Cl.
CPC .......... *G06F 3/016* (2013.01); *G06F 3/0414* (2013.01); *H04M 1/0249* (2013.01); *H04M 1/72569* (2013.01); *H04M 1/026* (2013.01)

(58) Field of Classification Search
CPC ........ G06F 3/0414; G06F 3/016; G06F 3/165; G08B 6/00
(Continued)

(56) References Cited

U.S. PATENT DOCUMENTS 9,330,544 B2    5/2016  Levesque et al.
9,665,198 B2 *  5/2017  Kies ................. G06F 3/0414
(Continued)

FOREIGN PATENT DOCUMENTS

CN    103838423 A    6/2014
CN    104423591 A    3/2015
(Continued)

OTHER PUBLICATIONS

International Search Report and Written Opinion dated Jun. 24, 2015, issued in Application No. PCT/SE2014/051103, 10 pages.
(Continued)

*Primary Examiner* — Toan N Pham
(74) *Attorney, Agent, or Firm* — Rothwell, Figg, Ernst & Manbeck, P.C.

(57) ABSTRACT

A mobile communications device adjusts a level of friction between a surface of the device and one or more other objects that may be in contact with the device, such as receipts, credit cards, keys, money, the user's hand or fingers, and the like. To adjust the friction, the device first determines its current environmental context, such as whether it is inside the user's pocket or lying on a table surface, for example. Then, based on that context, the device varies a coefficient of friction to increase or decrease the friction between the surface of the device and the surfaces of the other objects. Varying the friction allows a user to grip the device easier and/or reduce the chance that the other objects in contact with the device are also inadvertently removed from the storage location with the device.

21 Claims, 7 Drawing Sheets

(51) Int. Cl.
*H04M 1/725* (2006.01)
*G06F 3/041* (2006.01)
*H04M 1/02* (2006.01)

(58) Field of Classification Search
USPC .................... 340/665, 4.12, 686.1, 5.1, 7.6
See application file for complete search history.

(56) References Cited

U.S. PATENT DOCUMENTS

| | | | |
|---|---|---|---|
| 9,678,569 | B2 | 6/2017 | Birnbaum et al. |
| 9,711,014 | B2 | 7/2017 | Cruz-Hernandez et al. |
| 9,898,086 | B2 | 2/2018 | Cruz-Hernandez et al. |
| 2010/0283727 | A1 | 11/2010 | Jiang et al. |
| 2010/0283731 | A1 | 11/2010 | Grant et al. |
| 2011/0254671 | A1 | 10/2011 | Okimoto et al. |
| 2015/0355710 | A1 | 12/2015 | Modarres et al. |

FOREIGN PATENT DOCUMENTS

| | | |
|---|---|---|
| CN | 105807927 A | 7/2016 |
| WO | 2008124335 A1 | 10/2008 |
| WO | 2010129892 A2 | 11/2010 |

OTHER PUBLICATIONS

International Preliminary Report on Patentability dated Mar. 28, 2017, issued in Application No. PCT/SE2014/051103, 8 pages.
"A heart to my key", Babbage: Science and technology, Biometrics, www.economist.com, May 9, 2013, 7pages.
Purcher, J.: "Apple Reveals Wildly Intelligent Tiered Haptics System", www.patentlyapple.com, May 3, 2012, 9 pages.
Rao, S.: "High-definition haptics: Feel the difference!", Texas Instruments Incorporated, General Interest, Analog Applications Journal, 2012, 3Q, Texas Instruments Incorporated, 6 pages.
Littmann, W. et al.: "Sliding friction in the presence of ultrasonic oscillations: superposition of longitudinal oscillations", Archive of Applied Mechanics, 2001, vol. 71, pp. 549-554, Springer-Verlag.
Chubb E. et al.: "ShiverPad: A Device Capable of Controlling Shear Force on a Bare Finger", Third Joint Europhatics Conference and Symposium on Haptic Interfaces for Virtual Environment and Teleoperator Systems, Jul. 2009, pp. 18-23, IEEE.
Littmann, W. et al.: "Reduction of friction using piezoelectrically excited ultrasonic vibrations", proceedings of the SPIE, 2001; vol. 4331, 11 pages.
First Office Action in Chinese patent application 201480082119.6 dated May 5, 2019, 10 pages.

* cited by examiner

MOBILE COMMUNICATIONS DEVICE WITH ADAPTIVE FRICTION OF THE HOUSING

CROSS REFERENCE TO RELATED APPLICATIONS

This application is a continuation of U.S. application Ser. No. 15/513,747, which issued as U.S. Pat. No. 10,139,910 on Nov. 27, 2018, having a section 371 date of Mar. 23, 2017 (published as U.S. 2017/0285749), which is the national stage of international patent application no. PCT/SE2014/051103, filed on Sep. 25, 2014. The above identified applications and publication are incorporated by this reference.

TECHNICAL FIELD

The present disclosure relates to mobile communications devices configured to vary friction between its surface and the surface of another object in contact with the mobile communications device, and methods thereof.

BACKGROUND

Mobile communications devices, such as cellular telephones, are popular and very commonplace. Their popularity among users is due not only to the variety of functions they offer, but also to their size. Particularly, the size of such devices allows users to hold them comfortably, and place the device into a storage location, such as a pocket, a handbag, or similar location, when not in use. This permits the users of these devices to always keep their devices close at hand.

However, manufacturers continue to reduce the size of their devices. And as the devices get smaller and thinner, their surfaces become smoother. Further, some of the locations into which the user may place the device, such as in a pocket or handbag, are relatively small when compared to the user's hand. Thus, it is becoming increasingly more difficult for users to easily grip the device and remove it from such locations. Further compounding this issue is that other objects, such as receipts, keys, credit cards, money, other devices, or notes, for example, may also be in the same storage location proximate the device. Therefore, when a user removes his or her device from that location, the friction that exists between the surface of the user's device and these objects often times inadvertently causes the objects to be pulled out with the device. The user may not want to remove these other objects from the storage location when they remove their mobile communications device the storage location.

SUMMARY

Embodiments of the present disclosure provide a method and corresponding mobile communications device for adjusting a level of friction between the surface of the mobile communications device and the surfaces of one or more other objects (e.g., receipts, credit cards, keys, money, the user's hand or fingers, etc.) adjacent the device. Particularly, the device is configured to determine its current environmental context—i.e., its current environment or surroundings, such as whether it is inside the user's pocket or lying on a table surface, for example. Based on the determined environmental context, the device varies a coefficient of friction to increase or decrease the level of friction between the surface of the device and the surfaces of the other objects. Varying the level friction allows a user to grip the device easier and/or reduce the chance that a receipt, paper, or other such object adjacent the device is removed from the storage location when the user removes the device from that location.

In one embodiment, the present disclosure provides a method for varying a level of friction between a surface of a mobile communications device and one or more other surfaces. The method comprises determining an environmental context for a mobile communications device, and controlling the mobile communications device to vary a coefficient of friction based on the environmental context to increase or decrease the friction between the surface of the mobile communications device and the one or more other surfaces.

In some embodiments, the method also comprises detecting a predetermined event that occurs at the mobile communications device. For example, the device may detect that the user has gripped the device, and if so, where on the device the user is gripping, or detect the receipt of an incoming call.

Additionally, the method may further comprise determining an environmental context, such as a current surrounding environment, for the mobile communications device, and based on that environmental context, selecting a predefined friction profile. In such embodiments, the predetermined friction profile comprises information that defines a coefficient of friction for the given context. However, the predefined friction profile may also be selected based on other criteria as well, such as an event type for the predetermined event or on an identity of the user. Thus, in some embodiments, the method further calls for authenticating the user of the mobile communications device.

In one embodiment, the mobile communications device is controlled to vary a coefficient of friction based on the environmental context by increasing or decreasing the coefficient of friction based on where on the surface of the mobile communications device the user is gripping. This may comprise, for example, switching an operating mode of the mobile communications device to one of a hi-friction mode and a low-friction mode based on the environmental context of the device. Further, the coefficient of friction may be varied at different locations across the surface of the device.

In some embodiments, controlling the mobile communications device to vary a coefficient of friction based on the environmental context comprises controlling the device to vary the coefficient of friction at different locations across the surface of the mobile communications device based on the environmental context. For example, the mobile communications device may be controlled to alter the surface of the wireless communications device to increase or decrease the coefficient of friction based on the environmental context, or on one or more objects that are adjacent to the device.

In addition, the present disclosure also provides a mobile communications device. In this embodiment, the mobile communications device comprises a context sensor configured to sense a current environment of the mobile communications device, a haptic interface configured to vary a level of friction between a surface of the mobile communications device and one or more other surfaces, and a processing circuit. In one embodiment, the processing circuit is configured to determine an environmental context based on the current environment sensed by the context sensor, and control the haptic interface to vary the coefficient of friction based on the environmental context to increase or decrease the friction between the surface of the mobile communications device and the one or more other surfaces.

In some embodiments, the processing circuit is further configured to detect a predetermined event occurring at the mobile communications device, and to control the context sensor to determine the current environment responsive to detecting the predetermined event.

The device may also comprise other sensor devices, such as a grip sensor. In these embodiments, the grip sensor is configured to detect the user gripping the mobile communications device, and send signals to the processing circuit indicating the detection. In some aspects, the processing may also be able to determine where on the surface of the mobile communications device the user is gripping based on signals received from the grip sensor.

In at least one embodiment, the device further comprises a communications interface circuit. The device is configured to detect a predetermined event, such as the receipt of an incoming call via such an interface.

Additionally, in some aspects, the device further comprises a memory circuit configured to store one or more friction profiles. Each friction profile comprises information defining a corresponding coefficient of friction between the surface of the mobile communications device and one or more other surfaces. In these cases, the processing circuit is configured to select a friction profile from the one or more friction profiles stored in the memory circuit, and control the haptic interface to vary the coefficient of friction according to the information in the selected friction profile.

In some cases, the processing circuit is further configured to select the friction profile based on one or more of a detected user event, an environmental context determined for the mobile communications device, and an identity of the user of the mobile communications device. In some embodiments, the processing circuit is further configured to authenticate the user of the mobile communications device.

In some aspects of the disclosure, the device is configured to control the haptic interface to vary the coefficient of friction based on where on the surface of the mobile communications device the user is gripping.

The processing circuit is configured to control the haptic interface to vary the coefficient of friction in various ways. In one embodiment, for example, the processing circuit is configured to control the haptic interface to switch between a hi-friction mode and a low-friction mode. In other embodiments, however, the processing circuit is configured to control the haptic interface to vary the coefficient of friction at different locations of the surface of the mobile communications device, and/or to alter the surface of the mobile communications device to increase or decrease the friction between the surface of the mobile communications device and the one or more other surfaces.

In some embodiments, the device also comprises an object sensor. The object sensor is configured to detect one or more objects contacting the surface of the mobile communications device, and based on those signals, determine the environmental context of the mobile communications device.

A still further embodiment provides a mobile communications device comprising one or more modules for varying a coefficient of friction to vary a level of friction between a surface of the mobile communication and the surface(s) of one or more objects. Such functional modules include, for example, a sensing module for sensing a current environment of the mobile communications device, a haptic interface module for varying a level of friction between a surface of the mobile communications device and one or more other surfaces, and a processing module. The processing module is operative to determine an environmental context based on the current environment sensed by the sensing module, and to control the haptic interface module to vary the coefficient of friction based on the environmental context to increase or decrease the friction between the surface of the mobile communications device and the one or more other surfaces.

DETAILED DESCRIPTION

Generally, the term "haptics" refers to the science of tactile feedback—i.e., non-verbal communications involving touch. For example, when a user's mobile device receives an incoming call or text message, the device may vibrate. Typically, the vibration is achieved by controlling an inertial actuator within the device to vibrate the entire device. The vibration serves to alert the user to the incoming communication or to some other event. However, while such feedback is useful, there is another type of haptic technology that is also becoming popular. This technology is referred to as "high-definition haptics."

High-definition haptics allows the user to feel a greater variety of spatially or temporally separated effects, which may then be used to enhance the granularity of the effects that are produced. For example, rather than control a single inertial actuator within the device to vibrate the entire device as a whole, specific selected parts of the device may be controlled to vibrate to enhance the user's experience when using the device. APPLE'S MULTI-TIERED HAPTICS SYSTEM and MICROSOFT'S VACUUMTOUCH, for example, each utilize high-definition haptic techniques to simulate the presence of individual keys on a keyboard or create other surface effects.

Embodiments of the present disclosure utilize high-definition haptics technology to control the level of friction between a surface of a mobile communications device and the surfaces of one or more other objects (e.g., receipts, credit cards, keys, money, the user's hand or fingers, etc.) that may be in contact with the device. More particularly, a device configured according to embodiments of the present disclosure will determine its current environmental context—i.e., its current environment or surroundings using one or more sensors. By way of example, the device may be configured to detect where the device is currently located, such as whether the device is inside the user's pocket or lying on a table, as well as whether other objects, such as receipts, money, or the user's fingers, are adjacent to or in contact with the surface of the device. Based on the determined environmental context, the device controls a haptic interface to increase and/or decrease the level of friction between the surface of the device and the surfaces of the other objects. So adjusted, the embodiments of the present disclosure allow the user to more easily grip the device to remove the device from a given location, while also helping to prevent the inadvertent removal of other objects that may be adjacent to, or in contact with, the device in the location.

Figure 1:
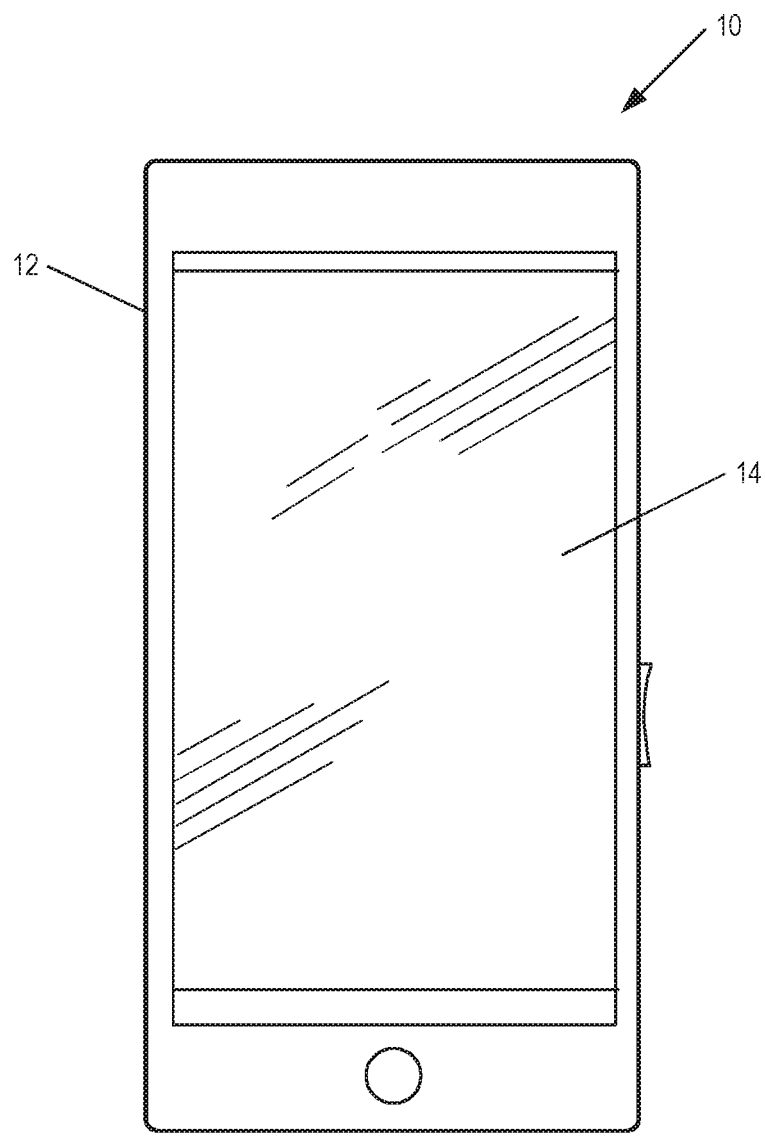
FIG. 1 is a view of a mobile wireless communications device configured according to one embodiment of the present disclosure.

Turning now to the drawings, FIG. 1 is a view of a mobile communications device 10 configured according to one embodiment of the present disclosure. As seen in FIG. 1, device 10 is a cellular telephone that comprises a housing 12 and a display 14. While device 10 is shown herein as being a cellular telephone, those of ordinary skill in the art should readily appreciate that this is for illustrative purposes only. The present disclosure is not limited only to cellular telephone applications. Rather, other consumer devices that may be handled by a user, such as laptop and tablet computing devices, for example, may also be configured according to the present disclosure to increase and/or decrease the friction between its surface and the surface of one or more other objects that are adjacent to, or in contact with, such devices. By way of example only, embodiments of the present disclosure may also utilize high-definition haptics technology to vary a level of friction between a surface of such a laptop or tablet computing device in a carrying case or a pouch, and the surfaces of one or more papers, books, cards, and the like, that may also be in the case or pouch in contact with the device.

Figure 2A:
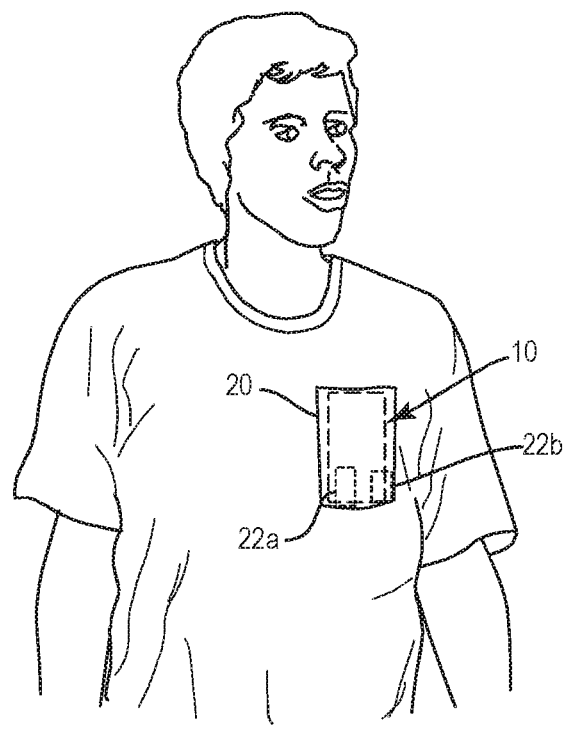
FIGS. 2A-2B are views of a mobile wireless communications device configured according to one embodiment being stored in a user's pocket.
Figure 2B:
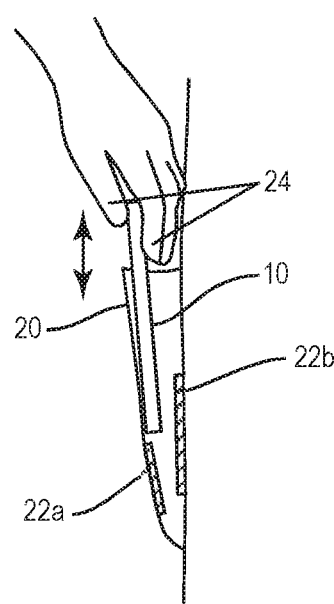

To adjust the level of friction between it and one or more other objects, device 10 varies a coefficient of friction based on its current environmental surroundings. For example, as seen in FIGS. 2A-2B, device 10 is in a shirt pocket 20 of a user. One or more other objects 22a, 22b, such as paper, money, cards, or receipts, and the like, are also inside pocket 20 and in contact with the housing 12 of device 10. As seen in FIG. 2B, the user may grip the housing 12 of the device 10 with his/her fingers 24 to remove the device 10 from pocket 20; however, the user would not want the objects 22a, 22b to be removed with device 10. By varying the coefficient of friction in accordance with the present disclosure, a device 10 is able to increase the level of friction between the surface of housing 12 and the user's fingers 24 allowing the user to better grip the device 10 when removing the device 10 from pocket 20. Additionally, or alternatively, however, varying the coefficient of friction decreases the level of friction between the surface of housing 12 and the one or more other objects 22a, 22b thereby avoiding the inadvertent removal of objects 22a, 22b from the pocket 20 along with device 10.

Figure 3:
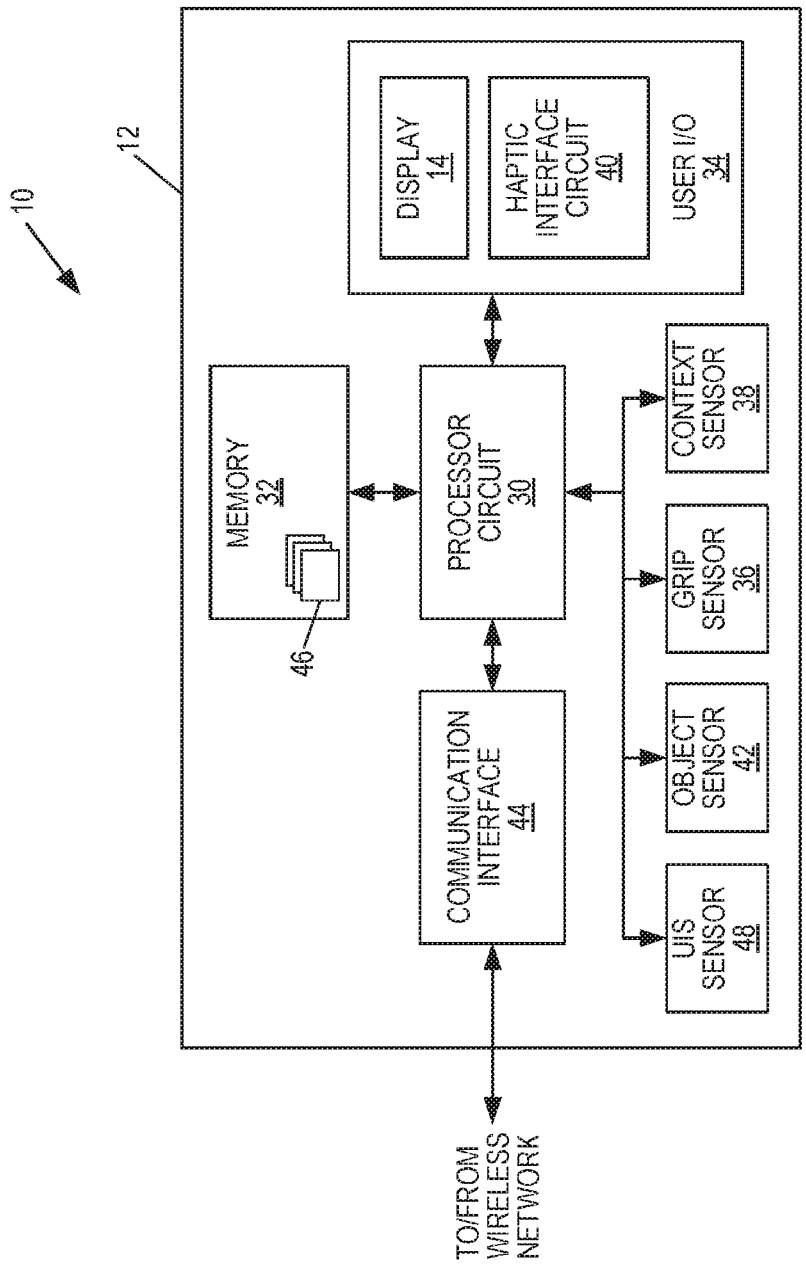
FIG. 3 is a block diagram illustrating some functional components of a mobile communications device configured according to one embodiment of the present disclosure.

FIG. 3 is a block diagram illustrating some of the functional modules or components contained within the housing 12 of device 10 according to one embodiment of the present disclosure. As seen in FIG. 3, device 10 comprises a processor, such as a processing circuit 30, a memory circuit 32, a user I/O interface 34, a grip sensor 36, a context sensor 38, an object sensor 42, and a communications interface circuit 44 configured to send and receive information and data with one or more remote devices via a communications network. The user I/O interface further comprises the display 14, which may be a touch-sensitive display, for example, and a haptic interface 40. As those of ordinary skill in the art will readily appreciate, device 10 may or may not comprise other components not specifically illustrated herein.

The processor comprises means for performing the functions described in the present disclosure. For example, as seen in FIG. 3, the processor may comprise a processing circuit 30 configured to execute instructions and code stored in memory 32 to perform the functions described herein. The memory circuit 32 and the processing circuit 30 may, as is illustrated herein, comprise separate components that communicate with each other via a bus, for example. However, those of ordinary skill in the art should readily appreciate that the present disclosure is not so limited. In some embodiments, the processor may incorporate memory 32 as a unitary module or circuit.

Processing circuit 30, which may comprise one or more microprocessors, microcontrollers, hardware circuits, or a combination thereof, generally controls the operation of device 10 according to logic and data stored in memory circuit 32. As seen in FIG. 3, processing circuit 32 particularly processes signals and data received from the communications interface circuit 44, as well as from each of the sensors 36, 38, and 42, and controls the components of device 10 accordingly. More specifically, processing circuit 30 controls haptic interface 40 to vary a coefficient of friction thereby increasing and/or decreasing the level of friction between the surface of housing 12 and the surface of one or more other objects 22a, 22b, 24, that may be in contact with, the surface of housing 12.

Memory circuit 32 stores the program code and data needed by the processing circuit 30 to operate as herein described. Memory circuit 32 may comprise a combination of volatile and non-volatile memory devices, and may include discrete memory devices as well as internal memory. Program code executed by the processing circuit 32 is typically stored in a non-volatile memory such as a read-only memory (ROM) or flash memory, while temporary data generated during operation of device 10 may be stored in a volatile memory, such as a random access memory (RAM).

In one embodiment of the present disclosure, memory circuit 32 stores a plurality of friction profiles 46. Each friction profile 46 comprises information that controls how the processing circuit 30 controls the haptic interface 40 to vary a coefficient of friction, and may be associated with a user, a detected event, one or more predetermined environmental contextual states, or a combination thereof. The friction profiles may be predefined by a manufacturer of the device 10, or by the user of device 10, for example, and indicate the level of friction between the surface of housing 12 and the one or more other objects 22a, 22b, 24 under specifically sensed circumstances.

By way of example only, a friction profile 46 may contain values that define the level of friction that should be present between the surface of housing 12 and the one or more other objects 22a, 22b, 24, responsive to detecting that the user picked up the device 10 to be in-use (IU). Additionally or alternatively, friction profile 46 may contain values that define the level of friction that should be present between the surface of housing 12 and the one or more other objects 22a, 22b, 24, responsive to detecting that the user is placing device 10 into pocket 20 (i.e., Transition To Storage—TTS), or removing device 10 from pocket 20 (i.e., Transition Away from Storage—TAS).

The values used to define the level of friction may be any values in any format needed or desired. However, in some embodiments, the values in the friction profiles 46 are simply binary values (e.g., '1' or '0'). The value '1' when processed by the processing circuit 30, causes the processing circuit 30 to maximize the level of friction between the surface of housing 12 and another object. The increased or maximized level of friction in this "high-friction mode" may make it easier for the user to grip the housing 12 of device 10 with his/her fingers 24 without inadvertently dropping device 10. In contrast, the value '0', when processed by the processing circuit 30, causes the processing circuit 30 to minimize the level of friction between the surface of housing 12 and other objects. This decreased or minimal level of friction in this "low-friction mode" may make it easier for the user to remove the device 10 from pocket 20, for example, without also inadvertently removing these other objects, such as objects 22a, 22b, from pocket 20.

In other embodiments, the friction profiles 46 contain a plurality of different values defining varying levels of friction to be applied across different parts of the surface of housing 12. Thus, by way of example only, a given friction profile 46 may contain a first value (e.g., '1') that causes the processing circuit 30 to maximize the level of friction over a first surface area of housing 12 typically gripped by the user with his/her fingers 24 when removing the device 10 from pocket 20, and a second value (e.g. '0') that minimizes the level of friction over a second area of housing 12 that is not typically gripped by the user when removing the device 10. Varying the friction differently over different areas of device 10 would allow the user to safely remove device 10 from pocket 20 without also inadvertently removing the objects 22a, 22b that are also inside of the user's pocket 20.

Regardless of the particular value or values that are stored in the friction profiles 46, however, each friction profile 46 may, as described in more detail below, be associated with a particular user, and/or a predefined user-driven event (e.g., "In-Use (IU)," "Transition Away from Storage (TAS)," "Transition To Storage (TTS)"), and/or with a particular environmental context sensed by one or more of the sensors 36, 38, 42.

Regarding the sensors, which may also comprise modules, Grip Sensor (GS) 36 comprises circuitry configured to detect the locations on housing 12 where the user's fingers 24 are gripping device 10. By way of example, the GS 36 may, in one embodiment, comprise a touch sensor, such as a capacitive touch screen, that detects when and where the user is touching the display of device 10. Signals indicating the detected position may be sent to the processing circuit 30 for processing. Additionally, or alternatively, GS 36 may comprise circuitry distributed over the surface of device 10 that detects a change in impedance over one or more different areas of the housing 12 of device 10. The changes in impedance are caused by the user's touch. Thus, when processed by processing circuit 30, the signals output by GS 36 may indicate whether a user has touched a mobile device in a predetermined manner or pattern, and in accordance with a resolution of the GS 36, identify the particular areas on device 10 that are currently being touched by the user.

In another embodiment, GS 36 may comprise one or more spatially separated transducers, such as microphones, for example, that are distributed across the housing 12 of device 10 and configured to detect the user's touch as audible sound. These sounds are also reported as signals to the processing circuit 30, which then computes an acoustic signature representing the locations where the user is touching device 10. For example, the processing circuit 30 may employ a beam-forming algorithm, as is known in the art, to compute the acoustic signature representing the locations of the user's touch on device 10 based on signals reported from some or all of the microphones.

The Context Sensor (CS) 38 comprises circuitry configured to sense the current environment of device 10. As stated above, such environments include, but are not limited to, the inside of a pocket 20 or handbag, or out in the open on a table, for example. In operation, CS 38 is configured to sense the current environment of device 10 based on various aspects such as a detected motion of device 10, a detected illumination level, and the like, as well as where device 10 is being used. Additionally, CS 38 may be utilized to sense whether a direction and trajectory of a user's hand gesture (e.g., detecting that the user's hand is approaching device 10) indicate that the user intends to grip or pick up device 10. To accomplish these functions, CS 38 may include a suitable sensor such as a gyroscope, a light sensor (e.g., a camera), an accelerometer, or the like, and may comprise a combination of such components.

According to embodiments of the present disclosure, CS 38 provides signals and/or data regarding the sensed environment to the processing circuit 30. Upon receipt, the processing circuit 30 utilizes those signals and/or data in one or more well-known algorithms to determine whether the user intends to perform such actions as pick-up or grab device 10 from inside a storage location such as pocket 20 or a table, take a picture, place an outgoing call or text, view images or video, play games, or place device 10 into the same or different storage location.

For example, where CS 38 comprises light and motion detection capabilities, CS 38 may provide signals indicating a detected level of light and motion to the processing circuit 30. If a low level of light is indicated, and the detected motion corresponds to the user's likely gait, the processing circuit 30 may determine that device 10 is in the user's pocket 20. If CS 38 also senses that the user's hand is approaching device 10, then CS 38 may also provide signals to processing circuit 30 indicating the user's intention to grip or pick-up device 10. These signals may also be used by processing circuit 30 to determine that device 10 is about to be removed from pocket 20, or placed back into pocket 20.

In another example, CS 38 may sense and provide signals indicating that a certain level of light has been detected (e.g., daylight). In such cases, if CS 38 also detects the user's eyes (e.g., using a forward facing camera associated with device 10), and senses that the user is gazing at display 14, then the processing circuit 30 may determine, based on the signals from CS 38, that device 10 is in use by the user. In some cases, the signals from multiple sensors may be used. For example, if the signals from GS 36 and CS 38 indicate that the user is gripping device 10 and moving device 10 to an area with low illumination, but is still in proximity to the user, then processing circuit 30 may determine that the user is placing device 10 back into pocket 20 or other storage location.

As those skilled in the art will readily appreciate, these are but some examples of the functions performed by the component(s) that comprise CS 38. However, regardless of the particular components and what they are configured to sense, the signal or signals output from CS 38 indicate any of a variety of different states for device 10 that correspond to user driven events. Such states include, but are not limited to:

(1) Transition Away from Storage (TAS)—where CS 38 senses that the user is removing device 10 from a storage location, such as pocket 20 or a table, for example;

(2) In Use (IU)—where the CS 38 senses that the user is currently using device 10 for some function such as placing a call or text, viewing images or video, taking a picture, playing a game, and the like; and (3) Transition To Storage (TTS)—where the CS 38 senses that the user is placing device 10 into a storage location such as pocket 20.

Based on the signals indicating these states, and others like them, processing circuit 30 can determine the environmental context of device 10.

The Haptic interface (HI) 40 comprises circuitry configured to adjust the friction between the surface of housing 12 and one or more other objects 22a, 22b, 24 that are in contact with the housing 12 of device 10. As previously described, HI 40 performs this function by selectively controlling a coefficient of friction in accordance with the values identified in one or more of the friction profiles 46. That is, controlling the haptic components of device 10 to operate according to these values sufficiently alters the coefficient of friction such that the level friction between the surface of device 10 and the one or more other objects 22a, 22b, 24 is effectively increased or decreased. Some HIs 40 will increase the coefficient of friction, thereby increasing the level of friction between the two surfaces, while other HIs 40 will decrease the coefficient of friction, thereby decreasing the level of friction between the two surfaces. In some embodiments, the HI 40 can selectively increase the coefficient of friction over some surface areas of device 10, while selectively decreasing the coefficient of friction over other surface areas of device 10. With this latter aspect, the HI 40 can both increase and decrease the level of friction over different surface areas of device 10.

In more detail, HI 40 comprises, in one embodiment, the existing haptic components of device 10, such as one or more tactile generator. However, in other embodiments, HI 40 comprises other components in addition to, or in lieu of, these existing components, such as interface panels and vacuum mechanisms, for example. Regardless, the components that comprise HI 40 are controlled by processing circuit 30 such that the coefficient of friction is increased or decreased.

By way of example only, HI 40 may comprise an interface panel in which selected elements are raised or lowered by a piezoelectric or other electrically operated actuator. Such elements include, for example, portions or parts of the housing 12 that alter or change a texture of the surface of housing 12. In another embodiment, HI 40 comprises a small motor connected to the interface panel. In use, the motor may be actuated to create a vacuum at certain points across the panel surface, and/or to a "negative vacuum" at other points across the surface of the panel. In such embodiments, the panel or housing 12 may comprise small holes communicatively connected to the motor. The holes may be selectively opened and closed to create varying levels of suction across selected areas of the panel or housing 12 (e.g., where ever the user is currently touching the surface of panel or housing 12) to increase friction, and/or create a positive airflow from the holes to decrease friction and gently push objects that are in contact with housing 12 away from housing 12.

In another embodiment, HI 40 may comprise an interface panel and/or other component configured to vibrate selected portions of housing 12 (or the entire housing) such that the force required by the user to move device 10 over the surface of another object is reduced. Such vibrations may be ultrasonic oscillations generated using techniques described in the article to W. Littmann, et. al., entitled "Sliding friction in the presence of ultrasonic oscillations: superposition of longitudinal oscillations," published in August of 2001 in the Archive of Applied Mechanics, Vol. 71, Issue 8, pp. 549-554, or in the paper authored by W. Littmann et. al., entitled, "Reduction of friction using piezoelectrically excited ultrasonic vibrations," published in Conference Proceedings of SPIE—The International Society for Optical Engineering, Vol. 4331, Smart Structures and Materials 2001: Damping and Isolation, 302 on Jul. 2, 2001. In some embodiments, HI 40 comprises a variable friction device, such as the device described in the paper authored by Chubb, et. al., entitled, "ShiverPad: A device capable of controlling shear force on a bare finger," published in the Third Joint Eurohaptics Conference and Symposium on Haptic Interfaces for Virtual Environment and Teleoperator Systems, pp. 18-23, Salt Lake City, Utah, USA, Mar. 18-20, 2009. The technology described in this paper generates a lateral (i.e., shear) force by vibrating a surface in contact with another object in two directions simultaneously. The first direction is in an "in-plane" direction (i.e., a lateral direction), while the second direction is an "out-of-plane" direction (i.e., a direction normal to the in-plane direction). Each of these papers is incorporated herein by reference in their entirety.

Those of ordinary skill in the art will readily appreciate that the particularly identified technologies are not the only technologies suitable for use with the present disclosure. Rather, other technologies, devices, and methods not specifically mentioned here may also be suitable for use with one or more embodiments. Regardless of how the HI 40 is controlled, however, controlling the HI 40 in accordance with the present disclosure varies the coefficient of friction thereby increasing or decreasing the level of friction between the surface of device 10 and the surface or surfaces of one or more other objects 22a, 22b, 24 that are in contact with the surface of device 10.

Object Sensor (OS) 42 comprises circuitry configured to detect other objects that may be in contact with device 10, and to provide that information to the processing circuit 30 for processing. By way of example only, OS 42, in one embodiment, comprises multiple microphones that capture audible sound caused by an object, such as a stylus or finger, for example, as it is drawn across a surface of device 10. Based on the sounds, the processing circuit 30 generates an acoustic signature utilizing any well-known beam-forming algorithm to compute the location of the object that is in contact with the device 10. Based on this location, the processing circuit 30 may control the HI 40, as stated above, to adjust the friction between the surface of device 10 and another object in contact with device 10 at that location.

In another embodiment, OS 42 comprises circuitry (e.g., capacitance-based circuitry) distributed across the surface of housing 12. In this embodiment, similar to GS 36, the circuitry of OS 42 is configured to detect whether the housing 12 is being contacted by another object (e.g., a paper receipt). Such detection may be performed using capacitive sensors, for example, in which the presence of an object in contact with the housing 12 varies the capacitance of the circuitry that comprises OS 42. These changes in capacitance are reported to the processing circuit 30, which in turn, uses that information to determine where on housing 12 the object is in contact with device 10. So informed, the processing circuit 30 can vary a coefficient of friction to minimize or decrease the level of friction that exists between that area of housing 12 and a surface of the object.

Those of ordinary skill in the art should readily appreciate that such circuitry for use as the OS 42 is exemplary only, and that other circuits and sensor technologies may be utilized to perform this function. Such sensing technologies include, but are not limited to, inductive and ultrasonic sensing technologies, such as those described in the article authored by Thomas A. Kinny and entitled, "Proximity sensors compared: Inductive, capacitive, photoelectric, and ultrasonic", published on Sep. 1, 2001 on the Machine Design website, and which is incorporated herein by reference in its entirety.

Those of ordinary skill in the art should appreciate that the circuitry comprising OS 42 may be separate from the circuitry that comprises the GS 36. Thus, while the functionality of each sensor may overlap in some embodiments, their functions can also be different. Accordingly, embodiments of the present disclosure may comprise sensors that are capable of detecting the grip or touch of a user, as well as the touch of other objects.

The User Identification System Sensor (UISS) 48 comprises circuitry configured to identify a user. For example, in one embodiment, the UISS 48 comprises a biometric sensor that measures, for example, the user's heartbeat and identifies the user from that heartbeat. Some suitable devices for such a sensor include, but are not limited to, conductive leads, fingerprint sensors, and optical sensors that measure biometrics with respect to the user's iris. Based on the information gathered by such devices, the processing circuit 30 can identify the user as being an authorized, or unauthorized, user of device 10.

In another embodiment, the UISS 48 comprises an optical sensor, such as a forward or rear facing camera, that is triggered to capture an image of a user when the user touches or picks-up device 10. The image may be image processed by the processing circuit 30, using any algorithm known in the art, and the results compared against data representing an authorized user. Provided the comparison results in a match, the user is authorized to use the device 10. In some embodiments, authorizing the user in this manner, or in another manner, allows the device 10 to select an appropriate friction profile 46 for the user, as stated above.

Regardless of the type of sensor used, or the method used to determine whether a given user is or is not authorized, the processing circuit 30 is configured to control HI 40 to adjust the level of friction between device 10 and the objects and users based on the signals provided by the UISS 48.

The communications interface circuit 44 may comprise a receiver and transmitter interface for communicating with one or more other remotely located devices over a communications network. The communications interface circuit 44 may effect such communications using one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. The communication interface circuit 44 implements receiver and transmitter functionality appropriate to the communication network links (e.g., optical, electrical, and the like), and the transmitter and receiver functions may share circuit components and/or software, or alternatively may be implemented separately.

In one embodiment, the communications interface circuit 44 comprises a radio transceiver configured to communicate with remote parties and devices via a wireless communications network, such as a mobile communications network. For example, the communications interface circuit 44 may be configured to communicate across an air interface with at least one base station (BS) utilizing any well-known protocol or that may be developed. Some exemplary protocols include, but are not limited to, protocols according to IEEE 802.xx, CDMA, WCDMA, GSM, EDGE, LTE, UTRAN, E-UTRAN, WiMax, and the like.

Figure 4:
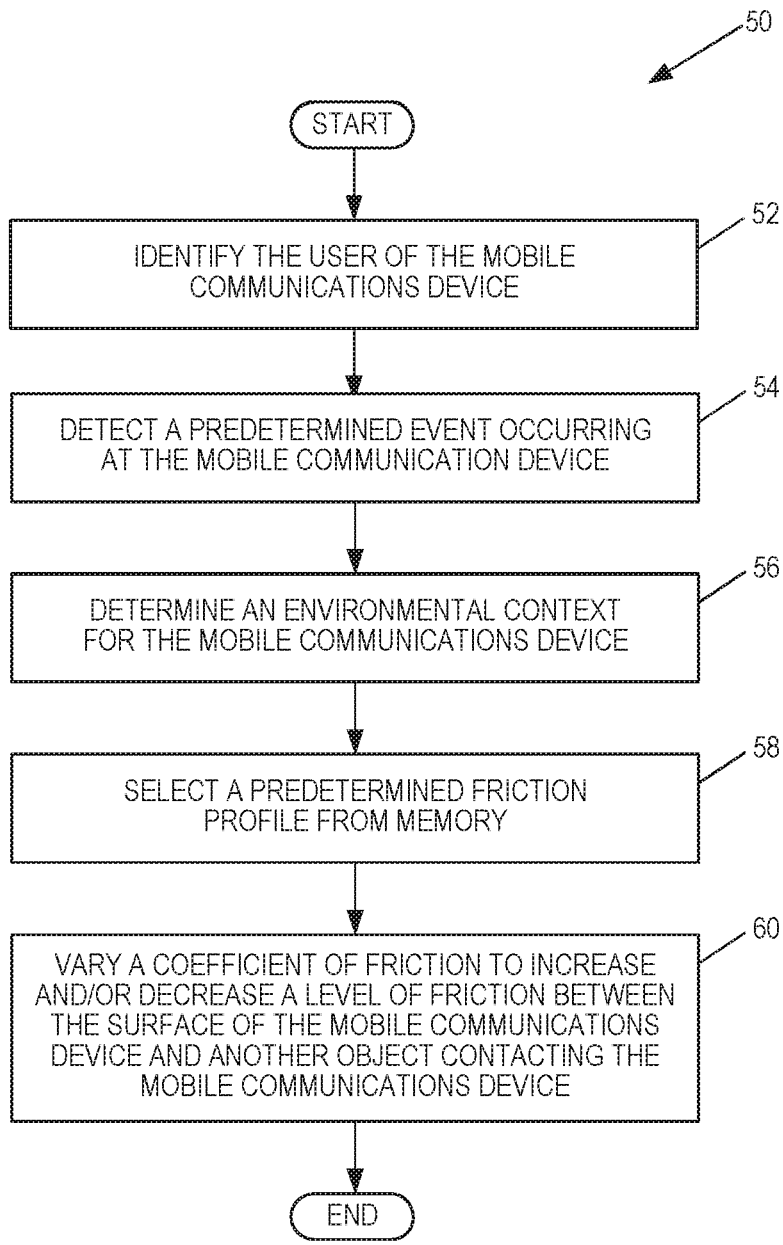
FIG. 4 is a flow chart illustrating a method for varying a coefficient of friction according to one embodiment of the present disclosure.

FIG. 4 is a flow diagram illustrating a method 50 for varying the level of friction between device 10 and one or more other objects that are in contact with device 10, such as objects 22a, 22b and the user's finger 24. In this embodiment, the flow diagram for method 50 begins with device 10 identifying or authorizing the user (box 52). This particular function is not required for device 10 to properly vary the level of friction; however, when device 10 does identify or authorize the user, it may do so using any known means or method. In one embodiment, device 10 utilizes the UISS 48 to measure a biometric characteristic of the user, as described above. Regardless of whether device 10 performs the identification function, the user will typically place device 10 in a storage location, such as pocket 20, when not actively using device 10.

Thereafter, device 10 will detect the occurrence of a predetermined event (box 54). As stated above, such predetermined events include the receipt of incoming calls or messages from a network, in response to which the user is likely to retrieve device 10 from its storage location 20, which but also include a determination that the user intends to grip or has gripped device 10 based on signals sent by one or more of the sensors 36, 38, 42. In response to detecting a predetermined event, device 10 determines its current environmental context (box 56). By way of example only, processing circuit 30 may determine whether device 10 is currently inside or outside of pocket 20 using the signals and/or data received from one or more of the sensors 36, 38, 42. So determined, device 10 may then select an appropriate friction profile 46 stored in the memory circuit 32 (box 58), and vary the level of friction between the surface of device 10 and one or more objects 22a, 22b, 24 in contact with device 10 in accordance with the values in the selected friction profile (box 60).

In some embodiments, for example, the friction profiles 46 are associated with the particularly identified events. In simple embodiments, the values within the friction profiles 46 may indicate a simplistic "binary" operation wherein the processing circuit 30 will either increase the level of friction to a predefined level (i.e., a so-called "high-friction mode"), or decrease the level of friction to a predefined level (i.e., a so-called "low-friction mode") responsive to detecting the event. In these cases, the processing circuit 30 may control HI 40 to vary the coefficient of friction in a predetermined manner, and thus, the level of friction between the surface of device 10 and the surface(s) of other objects, similarly over the entire surface of device 10.

In other more complex embodiments, however, the friction profiles 46 have a plurality of different values to be applied across different surfaces of the device 10. For example, upon detecting an incoming call or message, device 10 may determine that it is inside the user's pocket 20, and further, that one or more pieces of paper such as receipts or money (22a and 22b) are also inside pocket 20 contacting device 10. As stated above, this information is detected by the one or more of the sensors 36, 38, 42. In these situations, the values contained in the friction profile 46 may cause the processing circuit 30 to control HI 40 to vary the coefficient of friction across different portions of the device 10 such that the level of friction is increased in areas where the user will, or is likely to, grip the device 10 to pull device 10 out of pocket 20 to answer the call, while simultaneously decreased in those areas in contact with the papers or receipts to help prevent those objects from being inadvertently removed from pocket 20 along with the device 10. In some of these embodiments, the friction profile 46 may also be uniquely associated with a user such that he or she may customize the values, while in other embodiments, the values may be altered by the processing circuit 30 as it "learns" where the user typically grips device 10 in certain situations over time.

Figure 5:
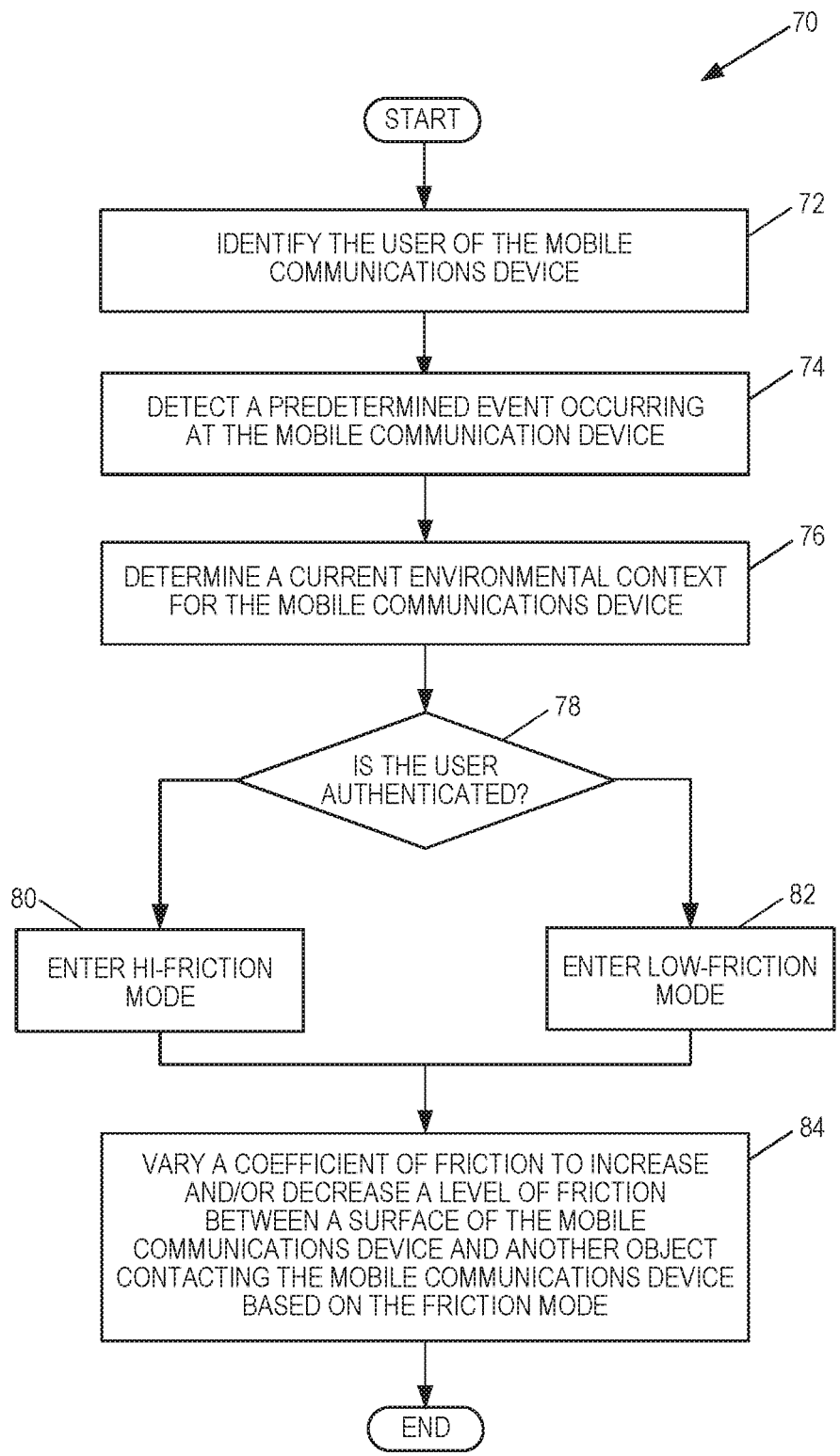
FIG. 5 is a flow chart illustrating a method for varying a coefficient of friction according to another embodiment of the present disclosure.

FIG. 5 is a flow diagram illustrating another embodiment of the present disclosure. In this embodiment, the processing circuit 30 utilizes the identification of the user, as well as the current environmental context of device 10, to determine how to vary the coefficient of friction, and thus, the friction between the surface of device 10 and one or more other objects, such as the user's fingers 24.

As seen in FIG. 5, method 70 identifies the user of device 10 (box 72). As previously stated, such identification and/or authorization may be accomplished using the UISS 48. When device 10 detects a predetermined event (box 74), device 10 determines it current environmental context using information and data sensed by one or more of the sensors 36, 38, 42 (box 76). Device 10 then determines whether the user is an authorized user based on the results if the earlier user identification (box 78). If the user is authorized, the device 10 will control the HI 40 to enter the high-friction mode (box 80). In this mode, the processing circuit 30 controls the HI 40 to vary the coefficient of friction to maximize the level of friction between the surface of device 10 and the user's fingers 24 (box 84). This assists an authorized user in gripping the device 10 when in use. If, however, the user is not an authorized user (box 78), the processing circuit 30 will control the HI 40 to enter the lo-friction mode (box 82). In this mode, the processing circuit 30 controls the HI 40 to vary the coefficient of friction to minimize the level of friction between the surface of device 10 and the user's fingers 24 (box 84). In this mode, the unauthorized user would have a more difficult time gripping device 10.

Figure 6:
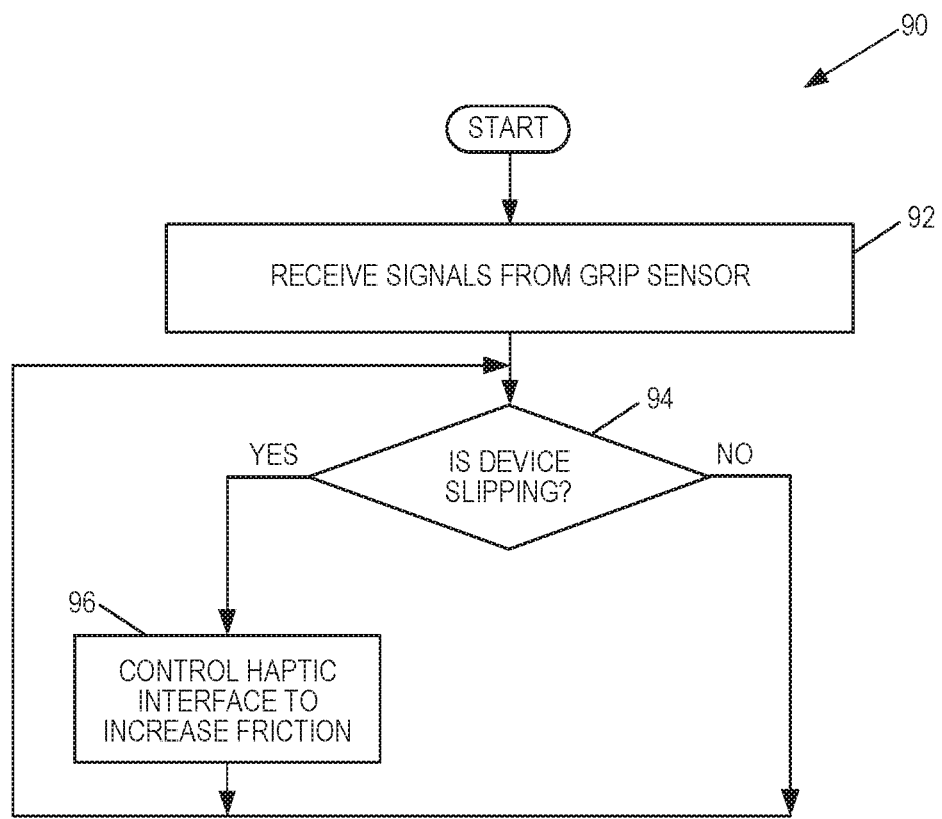
FIG. 6 is a flow chart illustrating a method for varying a coefficient of friction based on a user's current grip according to another embodiment of the present disclosure.

In addition to the above embodiments, device 10 may also be configured to control HI 40 in real-time, or near real-time, in accordance with data sensed by one or more of the sensors 36, 38, 42. For example, FIG. 6 is a flow diagram illustrating a method 90 for varyingly controlling HI 40 based on the feedback data from one or more of the sensors 36, 38, 42. Particularly, device 10 varies the level of friction based on whether the user has an adequate grip of device 10 with his/her fingers 24. For example, the user's hands may be sweaty or there may be some substance on the housing 12 that makes it difficult for the user to properly grip device 10.

As seen in FIG. 6, the processing circuit 30 receives signals from the grip sensor 36 that indicate the user's changing or varying grip (box 92). Such signals may be used by processing circuit 30 to determine, for example, whether device 10 is slipping from the user's hands, or is stable within the user's hands. If device 10 is slipping (box 94), processing circuit 30 will control HI 40 to increase the level of friction between the device 10 and the user's fingers 24 to assist the user in obtaining a better grip (box 96). By way of example, the processing circuit 30 may control HI 40 in a stepwise fashion to increase the friction in predetermined increments until it can detect that the user has a good hold on device 10. Conversely, if device 10 is not slipping through the user's hands (box 94), the processing circuit 30 simply continues to receive the signals (box 92).

Figure 7:
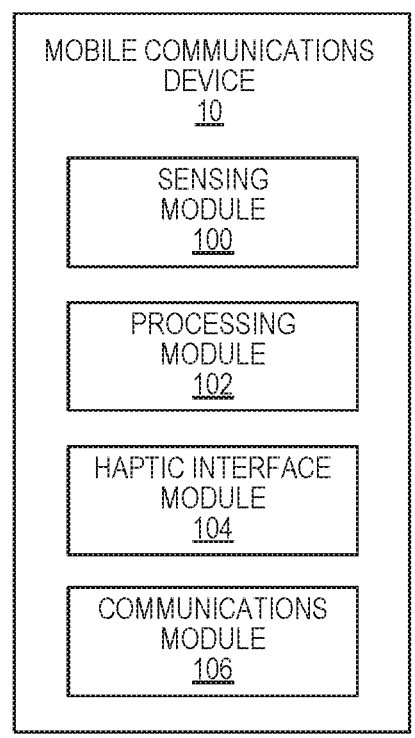
FIG. 7 is a functional module diagram of a mobile wireless communications device configured according to one embodiment of the present disclosure.

FIG. 7 is a functional block diagram illustrating some functional modules of a mobile communications device 10 according to one embodiment. Each module 100, 102, 104, and 106 may comprise dedicated hardware, programmable hardware together with appropriate firmware, or one or more processors together with appropriate computer program modules.

As seen in FIG. 7, the modules comprise a sensing module 100, a processing module 102, a haptic interface module 104, and a communications module 106. The sensing module 100 is operative to sense a current environment of the mobile communications device 10, as previously described, and to report that environment to the processing module 102 via signaling. Thus, in at least one embodiment, the sensing module 100 performs the functions described previously with respect to the context sensor 38. In other embodiments, however, the sensing module is further operative to perform the functions previously described with respect to one of more of the GS 36, the OS 42, and the UIS 48. Thus, the sensing module 100 may be operative in various embodiments to sense a variety of different objects and events (e.g., the user's grip and/or the surface(s) of papers or cards, as previously described), and to report such detections to the processing module 102.

The processing module 102, which may or may not comprise memory 32 and friction profiles 46, receives signals from the sensing module 100, and in response, generates control signals to control the haptic interface module 104. The control signals generated by the processing module 102 may be based on one or more values included in the friction profiles 46, as previously described. That is, the processing module 102 will control the haptic interface module 104 to vary a coefficient of friction thereby increasing and/or decreasing a level of friction between a surface of the mobile communications device 10 and the surfaces of the other objects (e.g., the user's fingers 24, papers 22a and 22b, and the like) that are in contact with the device 10.

The haptic interface module 104 is operative to vary a coefficient of friction responsive to receiving the control signals from the processing module 102. As stated above, varying a coefficient of friction may comprise the haptic interface module 104 altering one or more areas over a surface of the device 10, or controlling the device 10 to vary a level of friction between the entire surface of device 10 and the surfaces of the other objects sensed by the sensing module 100. In these latter cases, the haptic interface 104 may be controlled by the processing module 102 to increase or decrease the coefficient of friction so as to maximize or minimize the level friction between the surface of device 10 and the surfaces of the other objects sensed by the sensing module 100.

The communications module 106 is operative to send and receive signals and data to one or more remote parties via a network, as is known in the art. The communications module, which is operatively connected to the processing module 30, may communicate with such remote parties using any known communications protocols known in the art. In one embodiment, the communications module 106 comprises, for example, an interface for performing receiver and transmitter functions. In other embodiments, however, the communications module comprises radio transceiver circuitry configured to facilitate communications between the device 10 and one or more other devices via a mobile communications network and one or more BSs. Regardless of the embodiment, however, the communications module 106 includes transmitter and receiver functionality that may share circuit components and/or software, or alternatively may be implemented separately as independent components.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for varying friction between a surface of a mobile communications device and one or more other surfaces, the method comprising:
   detecting an incoming communication at the mobile communications device;
   controlling the mobile communications device to vary a coefficient of friction of at least a first portion of the surface of the mobile communications device based on the detected incoming communication to increase or decrease the friction between the first portion of the surface of the mobile communications device and the one or more other surfaces.

2. The method of claim 1, further comprising:
   detecting a user gripping the mobile communications device;
   determining a portion of the surface of the mobile communications device where the user is gripping the mobile communications device; and
   controlling the mobile communications device to increase the coefficient of friction of the portion of the surface of the mobile communications device where the user is gripping the mobile communications device.

3. The method of claim 2, wherein
   the portion of the surface of the mobile communications device where the user is gripping the mobile communications device is different than the first portion, and
   the step of controlling the mobile communications device to vary the coefficient of friction of at least the first portion of the surface of the mobile communications device comprises controlling the mobile communications device to decrease the coefficient friction of the first portion of the surface of the mobile communications device as a result of detecting i) the incoming communication and ii) that an object is adjacent to the first portion of the surface.

4. The method of claim 1, further comprising:
   detecting that an object is adjacent to the first portion of the surface of the mobile communications device, wherein
   controlling the mobile communications device to vary a coefficient of friction of at least the first portion of the surface of the mobile communications device comprises controlling the mobile communications device to decrease the coefficient of friction of the first portion of the surface of the mobile communications device as a result of detecting i) the incoming communication and ii) that the object is adjacent to the first portion of the surface.

5. The method of claim 1, wherein controlling the mobile communications device to vary the coefficient of friction of at least the first portion of the surface of the mobile communications device comprises increasing the coefficient of friction of the first portion of the surface and decreasing the coefficient of friction of a second portion of the surface of the mobile communications device.

6. The method of claim 1, wherein controlling the mobile communications device to vary the coefficient of friction comprises altering the surface of the wireless communications device to increase or decrease the coefficient of friction.

7. The method of claim 1, wherein controlling the mobile communications device to vary the coefficient of friction comprises switching an operating mode of the mobile communications device to one of a hi-friction mode and a low-friction mode.

8. The method of claim 1, wherein the method further comprises:
   determining that the mobile communications device is transitioning away from storage.

9. The method of claim 8, wherein the step of determining that the mobile communications device is transitioning away from storage further comprises determining one or more of:
   the mobile communications device is inside a handbag, or
   the mobile communications device is inside a pocket.

10. The method of claim 8, wherein the method further comprises:
    selecting a predetermined friction profile based on the determining the mobile communications device is transitioning away from storage.

11. The method of claim 1, wherein controlling the mobile communications device to vary a coefficient of friction of at least the first portion of the surface of the mobile communications device based on the detected incoming communication comprises:
    decreasing the friction between the first portion of the surface of the mobile communications device and the one or more other surfaces in response to detecting incoming communication.

12. A mobile communications device comprising:
    a communications interface circuit;
    a haptic interface configured to vary a level of friction between a surface of the mobile communications device and one or more other surfaces;
    a memory comprising instructions; and
    a processor operative to execute the instructions in the memory to:
    detect an incoming communication based on signals received from the communications interface circuit of the mobile communications device; and
    control the haptic interface to vary a coefficient of friction of at least a first portion of the surface of the mobile communications device based on the detected incoming communication to increase or decrease the friction between the first portion of the surface of the mobile communications device and the one or more other surfaces.

13. The mobile communications device of claim 12, further comprising a grip sensor configured to detect a user gripping the mobile communications device, wherein processor is further operative to execute the instructions in the memory to:
    detect a user gripping the mobile communications device based on signals from the grip sensor;
    determine a portion of the surface of the mobile communications device where the user is gripping the mobile communications device; and
    control the haptic interface to increase the coefficient of friction of the portion of the surface of the mobile communications device where the user is gripping the mobile communications device.

14. The mobile communications device of claim 13 further comprising an object sensor configured to detect one or more objects adjacent to the surface of the mobile communications device, wherein the portion of the surface of the mobile communications device where the user is gripping the mobile communications device is different than the first portion, and wherein the processor is further operative to execute the instructions in the memory to:

control the haptic interface of the mobile communications device to decrease the coefficient friction of the first portion of the surface of the mobile communications device as a result of detecting i) the incoming communication and ii) that an object is adjacent to the first portion of the surface.

15. The mobile communications device of claim 12, further comprising an object sensor configured to detect one or more objects adjacent to the surface of the mobile communications device, wherein the processor is further operative to execute the instructions in the memory to:
   detect that an object is adjacent to the first portion of the surface of the mobile communications device based on signals from the object sensor; and
   control the haptic interface to decrease the coefficient of friction of the first portion of the surface of the mobile communications device as a result of detecting i) the incoming communication and ii) that the object is adjacent to the first portion of the surface.

16. The mobile communications device of claim 12, wherein the processor is further operative to execute the instructions in the memory to:
   control the haptic interface to increase the coefficient of friction of the first portion of the surface and decrease the coefficient of friction of a second portion of the surface of the mobile communications device.

17. The mobile communications device of claim 12, wherein the processor is further operative to execute the instructions in the memory to:
   control the haptic interface to alter the surface of the wireless communications device to increase or decrease the coefficient of friction.

18. The mobile communications device of claim 12, wherein the processor is further operative to execute the instructions in the memory to:
   switch an operating mode of the mobile communications device to one of a hi-friction mode and a low-friction mode.

19. The mobile communications device of claim 12, further comprising a context sensor configured to detect an environmental context of the mobile communications device, wherein the processor is further operative to execute the instructions in the memory to:
   determine that the mobile communications device is transitioning away from storage based on signals from the context sensor.

20. The mobile communications device of claim 19, wherein the processor is further operative to execute the instructions in the memory to:
   determine one or more of (i) the mobile communications device is inside a handbag or (ii) the mobile communications device is inside a pocket based on signals from the context sensor.

21. The mobile communications device of claim 19, wherein the processor is further operative to execute the instructions in the memory to:
   select a predetermined friction profile based on the determining the mobile communications device is transitioning away from storage.

* * * * *